US012346537B2

(12) United States Patent
White et al.

(10) Patent No.: US 12,346,537 B2
(45) Date of Patent: Jul. 1, 2025

(54) PROXIMITY-ENABLED MACHINE CONTROL SYSTEM

(71) Applicant: PHUNWARE, INC., Austin, TX (US)

(72) Inventors: Jeffrey M. White, Snohomish, WA (US); Roger P. Ang, Huntington Beach, CA (US)

(73) Assignee: PHUNWARE, INC., Austin, TX (US)

( * ) Notice: Subject to any disclaimer, the term of this patent is extended or adjusted under 35 U.S.C. 154(b) by 27 days.

(21) Appl. No.: 17/978,779

(22) Filed: Nov. 1, 2022

(65) Prior Publication Data

US 2024/0143139 A1    May 2, 2024

(51) Int. Cl.
| G06F 3/048 | (2013.01) |
| G06F 3/0484 | (2022.01) |
| G06F 3/04886 | (2022.01) |
| H04W 4/021 | (2018.01) |
| H04W 4/80 | (2018.01) |

(52) U.S. Cl.
CPC ........ G06F 3/0484 (2013.01); G06F 3/04886 (2013.01); H04W 4/021 (2013.01); H04W 4/80 (2018.02)

(58) Field of Classification Search
CPC .... G06F 3/0484; G06F 3/04886; H04W 4/80; H04W 4/021
See application file for complete search history.

(56) References Cited

U.S. PATENT DOCUMENTS

| 8,768,249 | B2 | 7/2014 | Avadhanam et al. | |
| 9,661,554 | B2 * | 5/2017 | Maor | G01B 7/003 |
| 10,254,378 | B1 * | 4/2019 | Dang | G01C 21/1654 |
| 11,029,942 | B1 * | 6/2021 | Gordon | G06F 3/016 |
| 2010/0146091 | A1 * | 6/2010 | Curtis | H04N 21/41407 709/223 |
| 2014/0075075 | A1 * | 3/2014 | Morrill | H04M 1/72412 710/303 |
| 2016/0004845 | A1 * | 1/2016 | Choudhury | H04W 12/08 726/28 |
| 2017/0064073 | A1 * | 3/2017 | Spencer | H04M 1/724631 |
| 2017/0201647 | A1 * | 7/2017 | Neville | H04N 1/00344 |
| 2017/0208363 | A1 * | 7/2017 | Glazier | H04N 21/41407 |
| 2017/0208364 | A1 * | 7/2017 | Glazier | H04N 21/43615 |
| 2017/0265234 | A1 * | 9/2017 | Wallington | H04W 8/005 |
| 2018/0241489 | A1 * | 8/2018 | Daoura | H04L 67/10 |
| 2019/0006891 | A1 * | 1/2019 | Park | H02J 50/90 |
| 2020/0044888 | A1 * | 2/2020 | Manricks | H04W 28/0231 |
| 2022/0053078 | A1 * | 2/2022 | Dhing | H04W 4/021 |

FOREIGN PATENT DOCUMENTS

EP       2521342 A1 * 11/2012  ........... G06F 1/1626

* cited by examiner

*Primary Examiner* — Linh K Pham

(74) *Attorney, Agent, or Firm* — TIPS Group

(57) ABSTRACT

A proximity-enabled machine control system includes a user mobile device having a processor, a touch sensitive screen coupled to the processor, and non-transitory computer readable media with code segments executable on the processor for: (a) determining if the user mobile device is within a proximity zone of a machine; (b) displaying on the touch sensitive screen at least one machine control button for the machine; (c) detecting an activation of the at least one machine control button by the user; and (d) developing a machine control signal to control the machine.

11 Claims, 5 Drawing Sheets

PROXIMITY-ENABLED MACHINE CONTROL SYSTEM

BACKGROUND

Mobile devices, such as smartphones, have been used to control various physical devices such as computers, computerized systems, machines and other devices (collectively "machines"). For example, certain mobile devices are configured to control network-connected computer systems to perform various computer operations or with network connected devices such as lighting systems, door access systems, or computer operated elevators. Mobile devices have also been used to control devices directly through, for example, WiFi or Bluetooth communication.

The use of mobile devices to control computers, computerized systems, devices and machines presents certain security issues. For example, a mobile device user may not be authorized to control a machine or may control a machine in error, e.g. a mobile device user may accidently remotely summon an elevator or control a computerized lighting system in a building many miles away. Furthermore, since current mobile device users themselves typically configure the parameters of the machine control, there is potential for misuse of the remote control functionality of current machine control systems.

These and other limitations of the prior art will become apparent to those of skill in the art upon a reading of the following descriptions and a study of the several figures of the drawing.

SUMMARY

An example proximity-enabled machine control system includes a user mobile device having a processor, a touch sensitive screen coupled to the processor, and non-transitory computer readable media with code segments executable on the processor for: (a) determining if the user mobile device is within a proximity zone of a machine; (b) displaying on the touch sensitive screen at least one machine control button for the machine; (c) detecting an activation of the at least one machine control button by the user; and (d) developing a machine control signal to control the machine.

An example method for controlling a machine includes determining if a user mobile device is within a proximity zone of a machine, displaying on the user mobile device at least one machine control button for the machine, detecting an activation of the at least one machine control button by the user, and developing a machine control signal to control the machine.

An example non-transitory computer readable media including code segments executable on a processor including code segments determining if a user mobile device is within a proximity zone of a machine, code segments displaying on the user mobile device at least one machine control button for the machine, code segments detecting an activation of the at least one machine control button by the user, and code segments developing a machine control signal to control the machine.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
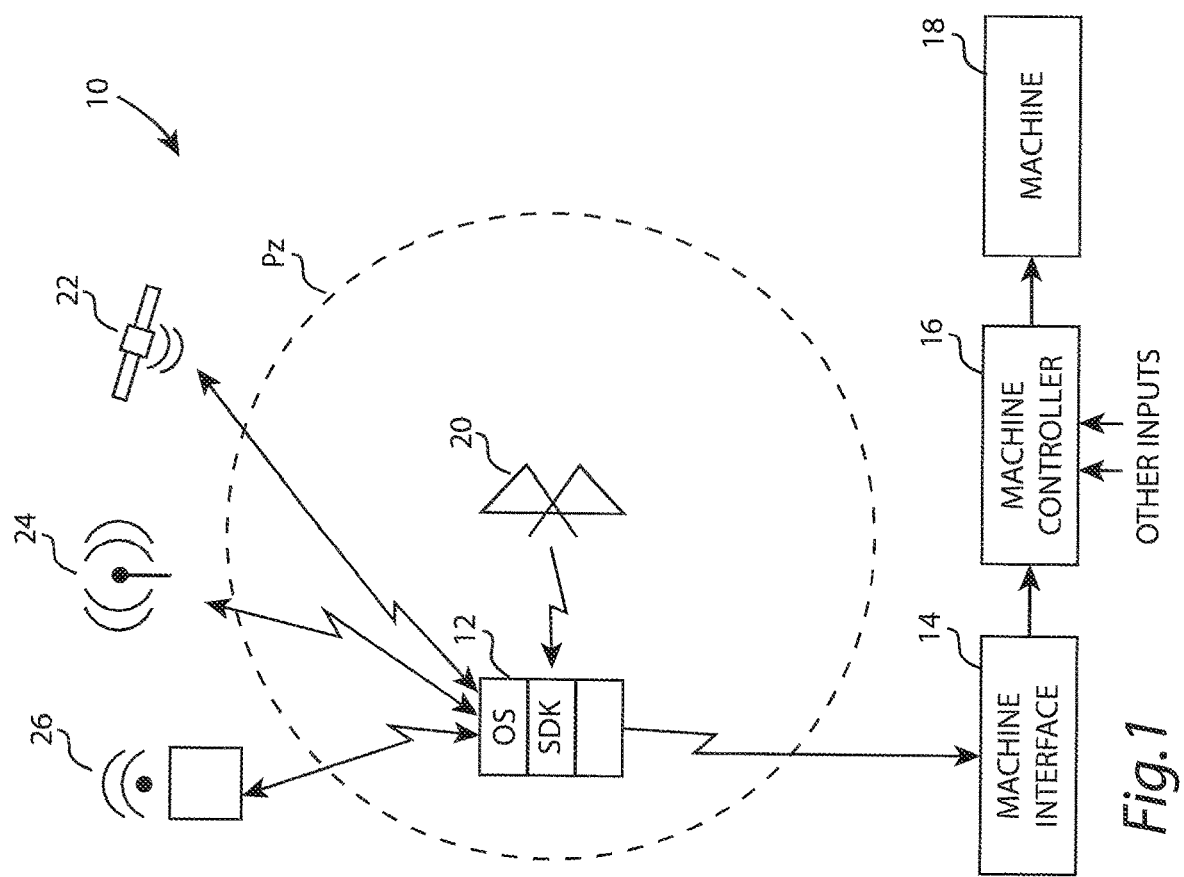
FIG. 1 is a diagram of an example proximity-enabled machine control system.

FIG. 1 is a diagram of an example proximity-enabled machine control system 10 including a user mobile device 12, a machine interface 14, a machine controller 16, and a machine 18. In this example, the user mobile device is within a proximity zone Pz that is implemented with a beacon 20, e.g. a Bluetooth beacon. While the proximity zone Pz is illustrated to be roughly circular in cross section, it will be appreciated that the proximity zone Pz is actually three dimensional and of various shapes and configurations. Also, in other example embodiments, the proximity zone Pz can be defined in other ways which do not require a beacon. For example, the proximity zone Pz can be a geofence around a geographical area using information from one or more of a global positioning system (GPS) 22, cellular data 24 or WiFi 26. The user mobile device can be a smartphone having an operating system (OS) and a software development kit (SDK) to provide code segments to implement proximity-enabled machine control processes.

Figure 2:
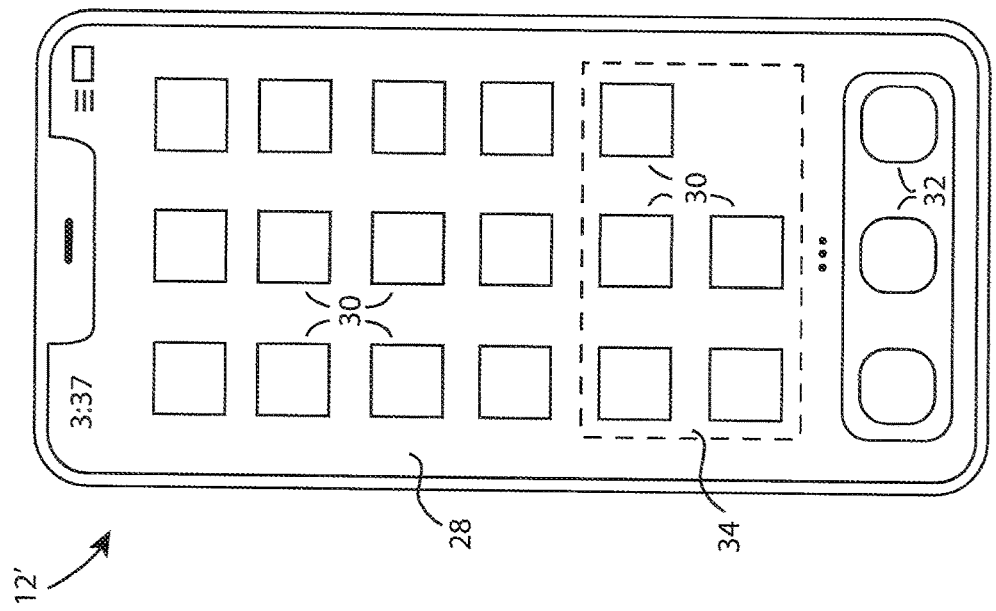
FIG. 2 is an illustration of an example touch sensitive screen of a user mobile device.

FIG. 2 is an illustration of an example touch sensitive screen ("touchscreen") 28 of a user mobile device 12'. In this example, the touchscreen 28 includes a number of icons or "buttons" 30 associated with a current display screen and a number of buttons 32 associated with all display screens. In this example, there is an area 34 which can be used to display at least one machine control button if the user mobile device 12' is within a proximity zone of a machine and if the user is authorized to control the machine. When the user isn't within a proximity zone and/or isn't authorized to control the machine, additional buttons 30 can be displayed.

Figures 3A, 3B, 3C:
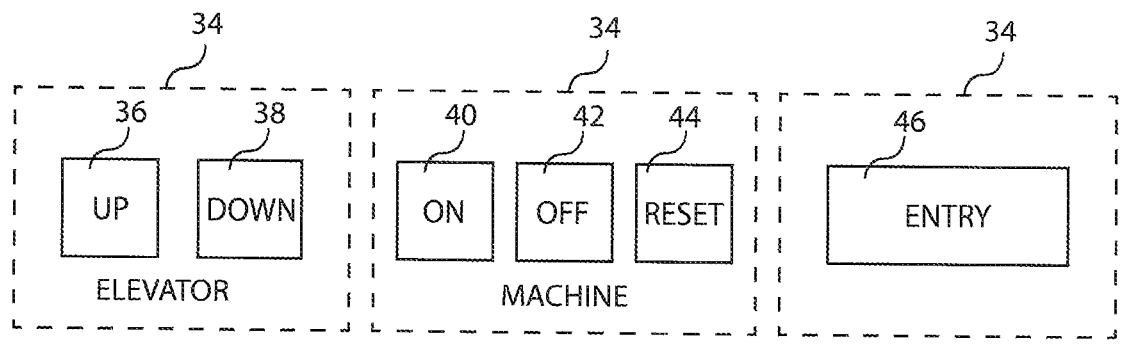
FIGS. 3A, 3B and 3C are illustrations of example machine control buttons that can be displayed on the touch sensitive screen of FIG. 2.

FIG. 3A illustrates first example machine control buttons including an elevator "UP" button 36 and an elevator "DOWN" button 38 displayed at area 34 on the touch sensitive screen 28. When the UP button 36 is activated, e.g. by the user touching the displayed image of the button, an elevator car within the proximity zone is summoned to take the user up. When the DOWN button 28 is activated, an elevator car within the proximity zone is summoned to take the user down.

FIG. 3B illustrates second example machine control buttons including a machine "ON" button 40, a machine "OFF"

button 42, and a machine "RESET" button 44. This configuration of machine control buttons are useful for a variety of machines, including computers, servers, programmable lighting displays, automated manufacturing, equipment, etc.

FIG. 3C illustrates a third example machine control button including an "ENTRY" button 46. This button can be used, for example, to allow entry through a normally locked door or gate, or other single-function purpose. A single button can also be used as a toggle button, e.g. first turning on a machine and then turning off the machine.

Figure 4:
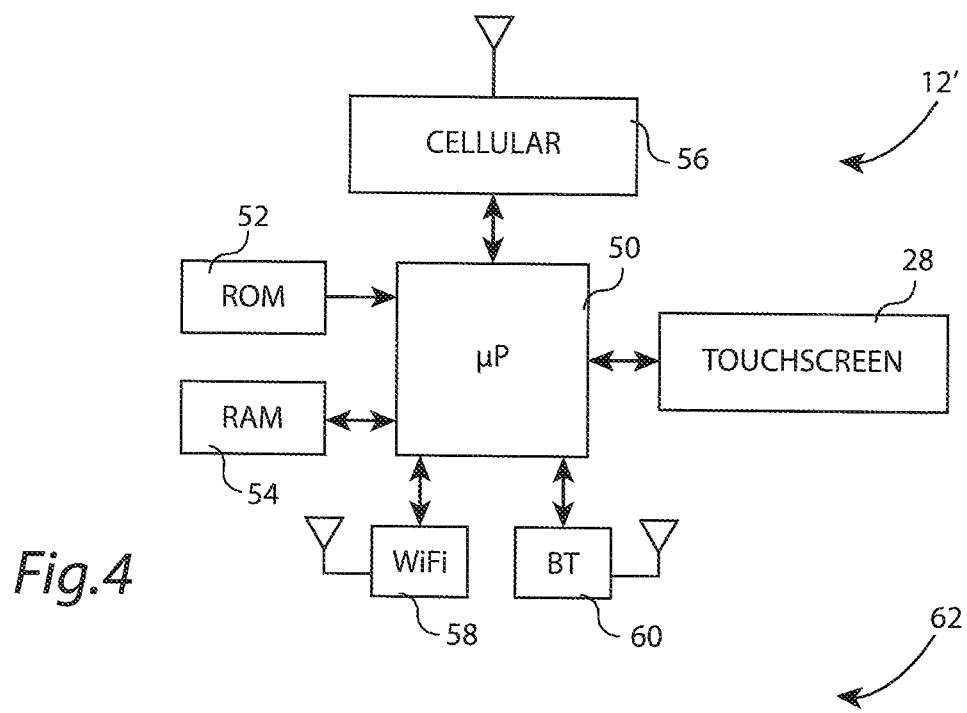
FIG. 4 is a block diagram of an example user mobile device.

FIG. 4 is a block diagram of the example user mobile device 12' which includes a microprocessor (µg) 50, read only memory (ROM) 52, random access memory (RAM) 54, a cellular system transceiver 56, a WiFi transceiver 58, a Bluetooth (BT) transceiver 60, and the touchscreen 28, The ROM 52 and RAM 54 comprise non-transitory computer readable media which can store code segments implementing various processes disclosed herein. For example, part or all of the operating system (OS) of the mobile device 12' can be stored in ROM 52, and part or all of the SDK of the mobile device 12' can be stored in the RAM 54. Other non-transitory computer readable media can also communicate with the microprocessor 50, as will be appreciated by those of skill in the art.

Figure 5:
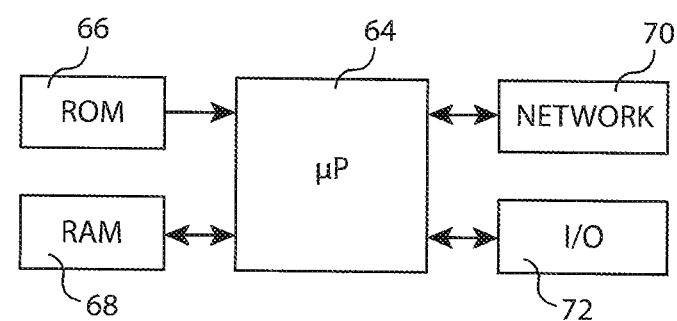
FIG. 5 is a block diagram of an example computer, server, or controller.

FIG. 5 is a block diagram of an example computer platform 62 for a server, device or interface including a microprocessor (µP) 64, read only memory (ROM) 66, random access memory (RAM) 68, a network interface 70, and input/output (I/O) interface 72. Communications with the computer platform 62 from other computers, systems and devices can be via the network interface 70 or the I/O interface 72, or both.

Figure 6:
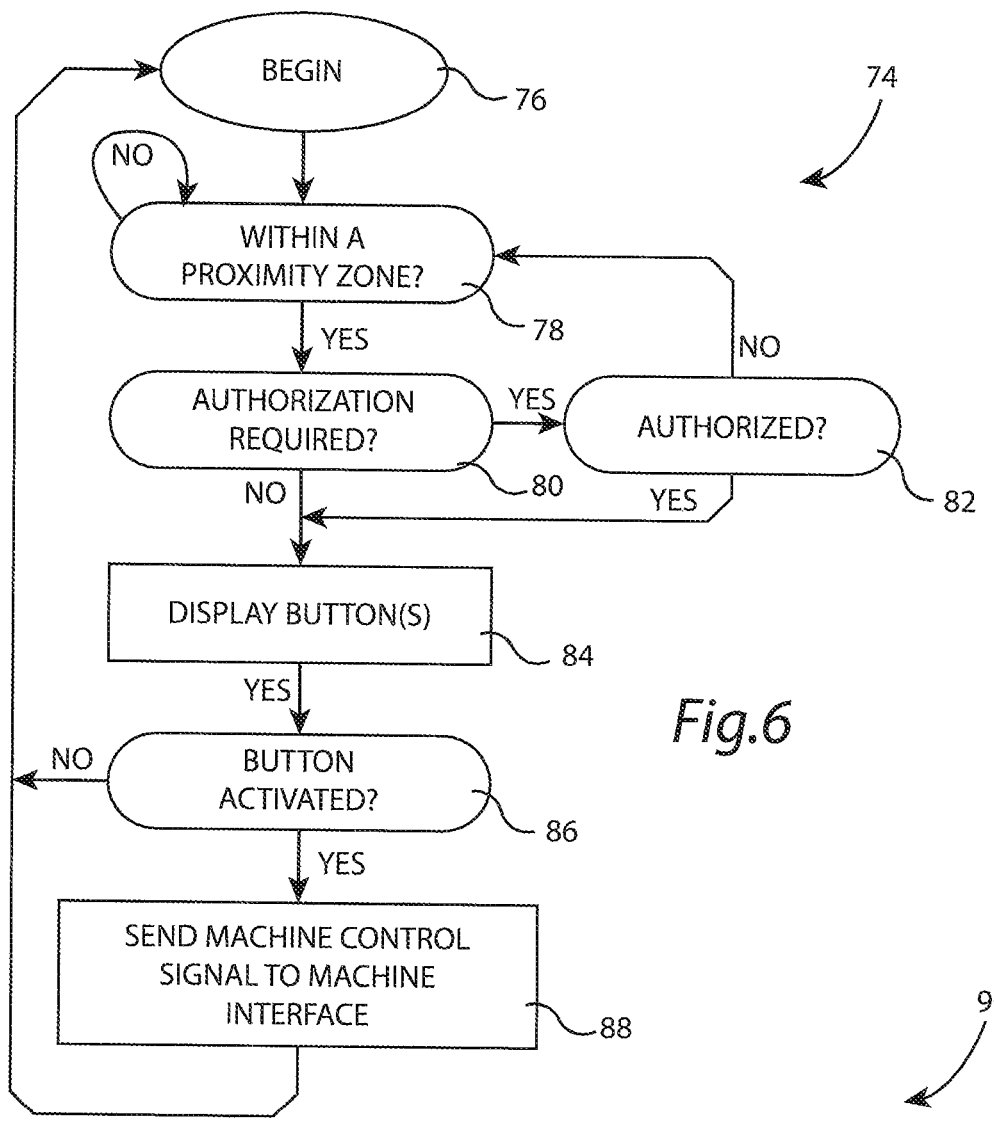
FIG. 6 is a flow diagram of a user mobile device process for sending a machine control signal to a machine interface.

FIG. 6 is a flow diagram of a user mobile device process 74 for sending a machine control signal to a machine interface. Process 74 begins at 76 and, in an operation 78, it is determined if the user mobile device is within a proximity zone. If yes, an operation determines if authorization is required for that user to access machine control features. If yes, an operation 82 determines if the user is authorized and, if not, process control is returned to operation 78. If no authorization is required or if the user is authorized, an operation 84 displays buttons on the touchscreen of the user mobile device. Next, in an operation 86, it is determined if one of the buttons displayed on the touchscreen has been activated, e.g. by touching the image of a button or otherwise engaging with the button. If not, process control returns to operation 78. If a button has been activated, an operation 88 sends a machine control signal to a machine interface before returning control to operation 78.

Figure 7:
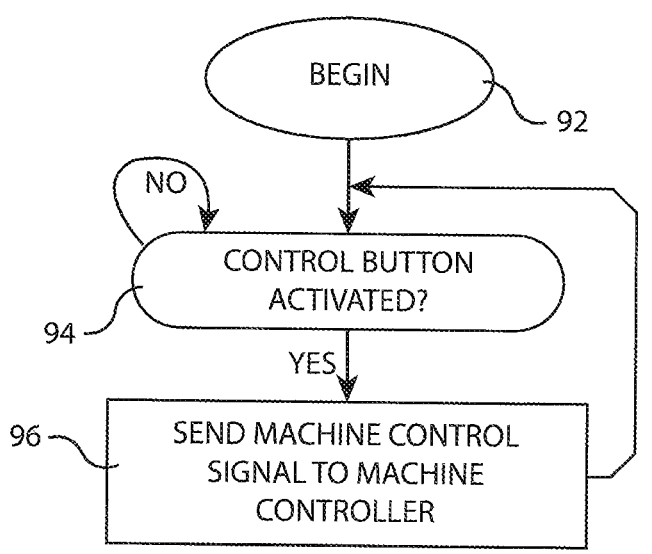
FIG. 7 is a flow diagram of a machine interface process for controlling a machine.

FIG. 7 is a flow diagram of a machine interface process 90 for controlling a machine including determining if a control button has been activated on the user mobile device in an operation 94. If not, operation 94 idles. If a control button has been activated, an operation 96 sends a machine control signal to the machine controller before returning process control to operation 94.

Figure 8:
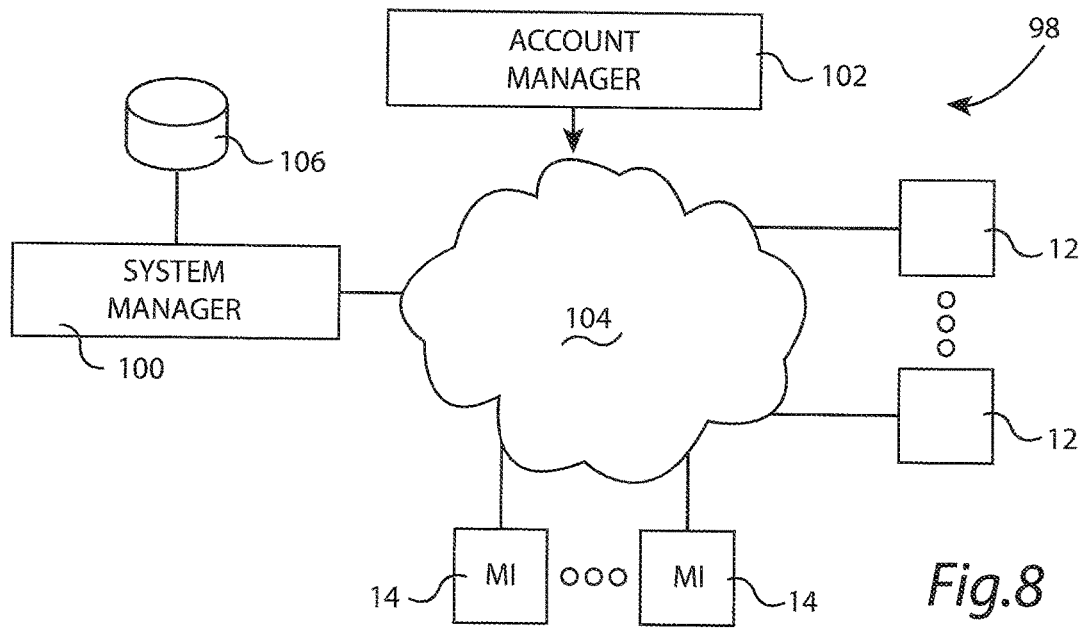
FIG. 8 is a diagram of an example proximity-enabled machine control system with a system manager and an account manager.

FIG. 8 is a diagram of an example proximity-enabled machine control system 98 including a number of user mobile devices 12, a number of machine interfaces 14, a system manager server 100, and account manager station 102, and a network 104 providing mutual communication. The system manager server 100 has, in certain example embodiments, a mass storage device 106 which includes data regarding multiple user mobile devices 12, machine interfaces 14, and account manager stations 102.

Figure 9:
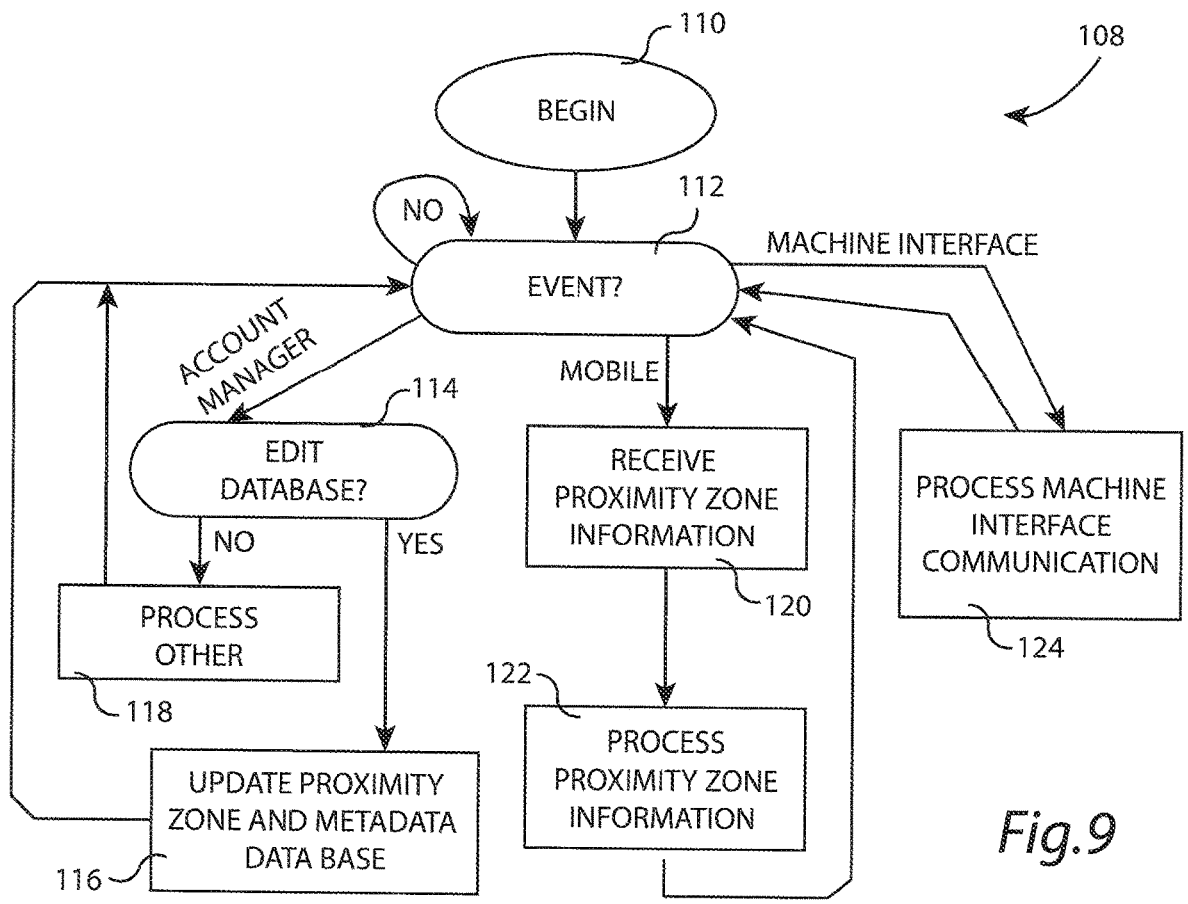
FIG. 9 is a flow diagram of a system manager process.

FIG. 9 is a flow diagram of a system manager process 108 which begins at 110 and, in an operation 112, it is determined if a communication event has occurred. If not, operation 112 idles until a communication event occurs. If operation 112 determines that there is a communication event from the account manager 102, an operation 114 determines if the account manager wants to edit one or more proximity zones. If yes, a database stored, for example, on the system manager's mass storage device, is updated with the account manager's edits. For example, the account manager may wish to create a new proximity zone, or modify the metadata associated with an existing proximity zone. If the account manager does not wish to edit the database but wishes to perform other processes such as generating reports, an operation 118 process such other tasks. Process control then returns to operation 112.

If operation 112 determines that there is a communication event from a user mobile device 12 an operation 120 receives proximity zone information from the user mobile device. Examples of proximity zone information includes a beacon signal received by the user mobile device, the location of the user mobile device, geofence information, etc. Operation 122 the processes the proximity zone information before returning process control to operation 112. If operation 112 determines that the communication event is a machine interface communication, the machine interface is processed in an operation 124 before process control returns to operation 112. For example, the machine interface can report the status and operability of the machine controller, the interaction of a user with the machine interface, error messages, etc.

Figure 10:
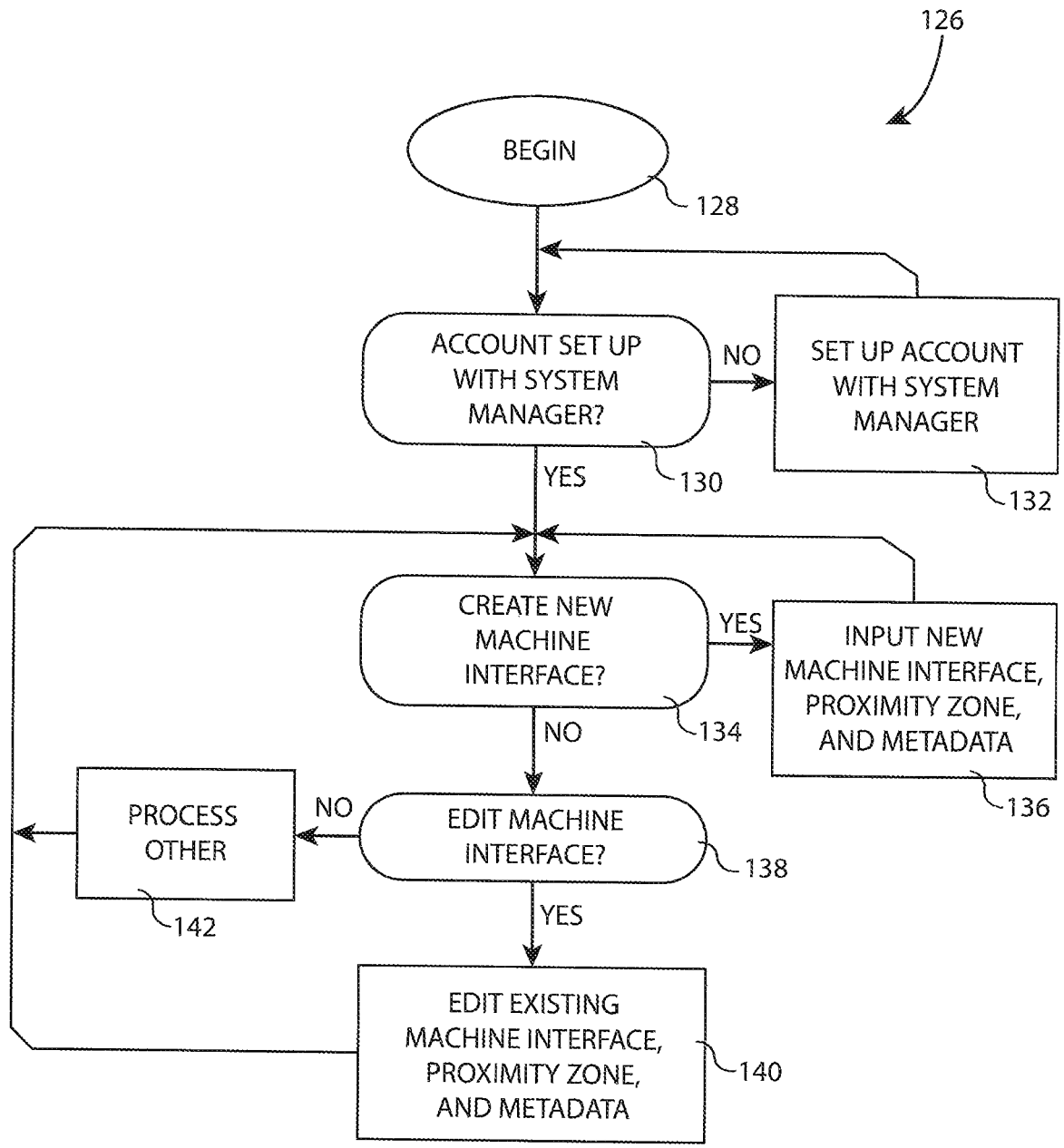
FIG. 10 is a flow diagram of an account manager process.

FIG. 10 is a flow diagram of an account manager process 126 which begins at 128 and, in an operation 130, determines if the account is sent up with the system manager. If not, the account manager is set up with the system manager in an operation 132 and process control is returned to operation 130. When operation 130 verifies that the account is set up with the system manager it is determined whether the account manager wants to set up a new machine interface for proximity-enabled machine control. If yes, the account manager inputs metadata concerning the new machine interface and its proximity zone in an operation 136 before returning process control to operation 134. If operation 134 determines that no new machine interface metadata is to be created, an operation 138 determines if existing machine interface metadata is to be edited. If so, an operation 140 edits existing machine interface, proximity zone, and/or metadata before returning process control to operation 134. If operation 138 determines that the account manager does not wish to edit existing machine interface metadata, other processes can be performed, in an operation 142 before process control returns to operation 134. For example, the account manager may wish to perform housekeeping functions, add another manager, or delete a particular machine interface metadata from the database.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A proximity-enabled machine control system comprising:
- a system manager server in communication with a wide area network and including a machine proximity zone database;
- an account manager station in communication with the wide area network to edit the machine proximity zone database;
- an immobile Bluetooth beacon device continuously transmitting an identity packet signal to define a fixed three dimensional proximity zone Pz, where the identity packet signal is identified with a machine proximity zone stored in the machine proximity zone database;
- a machine interface in communication with the wide area network and associated with the machine proximity zone; and
- a user mobile smartphone device in communication with the wide area network and having a processor, a touch sensitive screen coupled to the processor, and non-transitory computer readable media with code segments executable on the processor for determining, using the machine proximity zone database, if the user mobile smartphone device is physically within the fixed three dimensional proximity zone Pz of the Bluetooth beacon device and if the user mobile smartphone device is authorized to control a machine coupled to the machine interface and, if so,
    (a) displaying on the touch sensitive screen at least one machine control button for the machine;
    (b) detecting an activation of the at least one machine control button by the user; and
    (c) developing a machine control signal to control the machine via the machine interface;
- wherein the system manager server can process events related to the machine interface, the user mobile smartphone device, and the account manager station due to their respective connections to the wide area network.

2. The proximity-enabled machine control system as recited in claim 1 wherein a plurality of machine control buttons of different functionalities are displayed.

3. The proximity-enabled machine control system as recited in claim 2 wherein the machine control signal corresponds to the machine control button activated by the user.

4. A method for controlling a machine comprising:
- using a user mobile smartphone device to access a machine proximity zone database of a system manager server over a wide area network;
- determining, using the machine proximity zone database, if the user mobile smartphone device is physically within a fixed three dimensional proximity zone Pz of a machine defined by an immobile Bluetooth beacon device and if the user mobile smartphone device is authorized to control the machine via a machine interface and, if so,
    (a) displaying on the user mobile smartphone device at least one machine control button for the machine;
    (b) detecting an activation of the at least one machine control button by the user; and
    (c) developing a machine control signal to control the machine via the machine interface.

5. The method for controlling a machine as recited in claim 4 wherein a plurality of machine control buttons of different functionalities are displayed.

6. The method for controlling a machine as recited in claim 5 wherein the machine control signal corresponds to the machine control button activated by the user.

7. The method for controlling a machine as recited in claim 6 further comprising editing the machine proximity zone database using an account manager station.

8. A non-transitory computer readable media including code segments executable on a processor comprising:
- code segments using a user mobile smartphone device to access a machine proximity zone database of a system manager server over a wide area network;
- code segments determining, using the machine proximity zone database, if the user mobile smartphone device is physically within a fixed three dimensional proximity zone Pz of a machine defined by an immobile Bluetooth beacon device and if the user mobile smartphone device is authorized to control the machine via a machine interface;
- code segments displaying on the user mobile smartphone device at least one machine control button for the machine;
- code segments detecting an activation of the at least one machine control button by the user; and
- code segments developing a machine control signal to control the machine via the machine interface.

9. The non-transitory computer readable media including code segments executable on a processor as recited in claim 8 wherein a plurality of machine control buttons of different functionalities are displayed.

10. The non-transitory computer readable media including code segments executable on a processor as recited in claim 9 wherein the machine control signal corresponds to the machine control button activated by the user.

11. The non-transitory computer readable media including code segments executable on a processor as recited in claim 10 further comprising editing the machine proximity zone database using an account manager station.

* * * * *